United States Patent Office 3,721,960
Patented Mar. 20, 1973

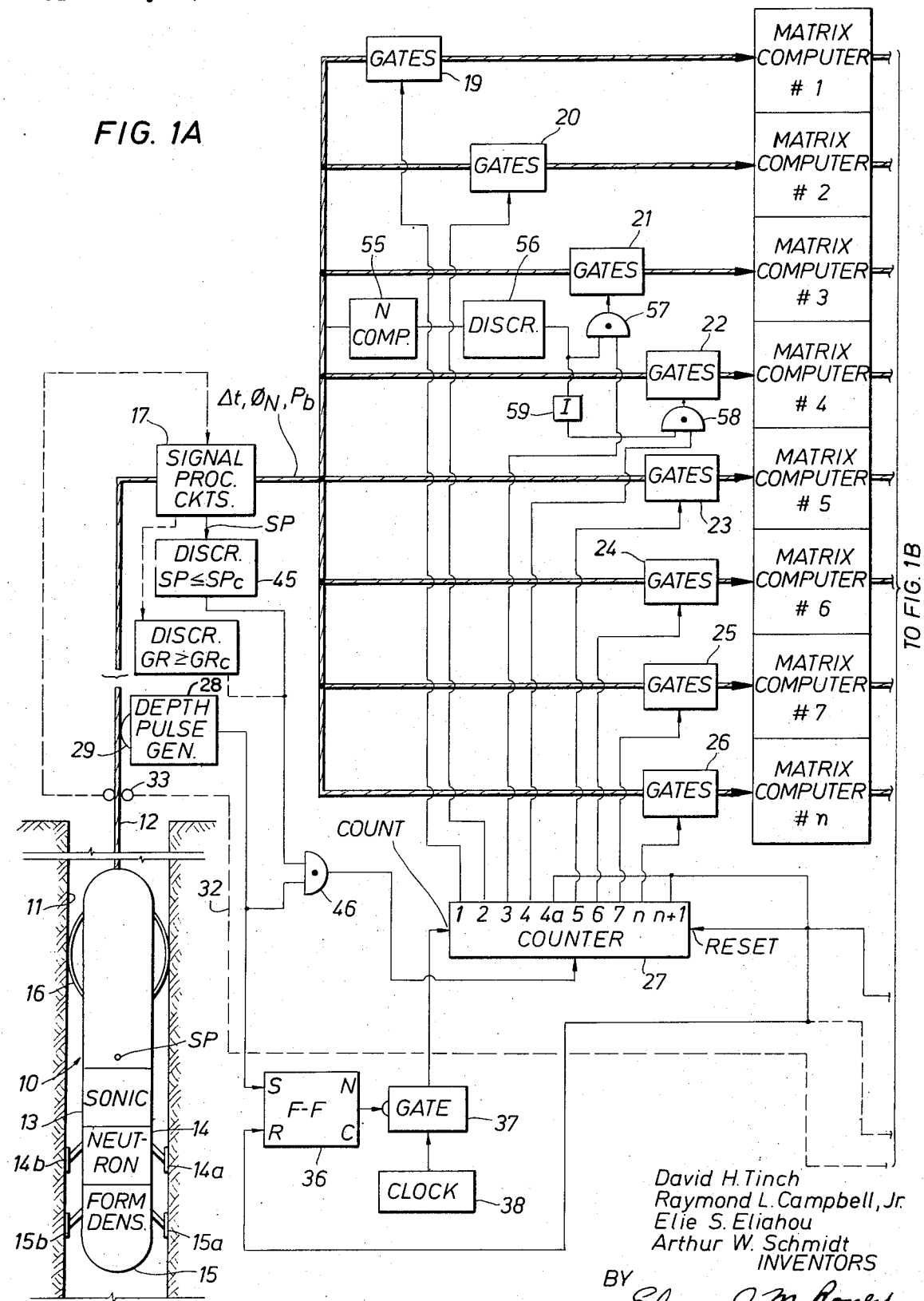

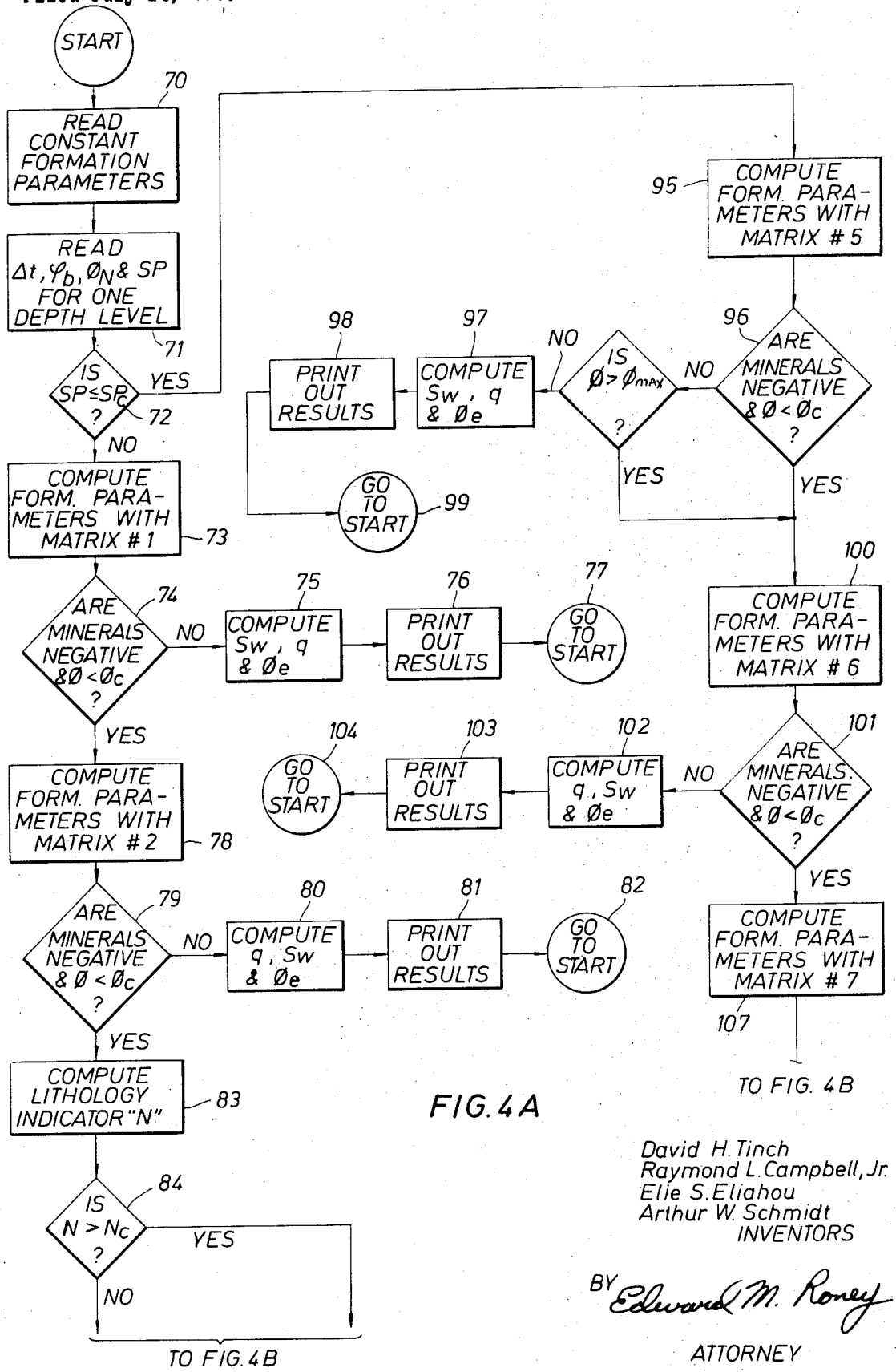

3,721,960
METHODS AND APPARATUS FOR PROCESSING WELL LOGGING DATA
David H. Tinch, New Orleans, La., Raymond L. Campbell, Jr., Garches, France, Elie S. Eliahou, Danbury, Conn., and Arthur W. Schmidt, Houston, Tex., assignors to Schlumberger Technology Corporation, New York, N.Y.
Filed July 14, 1969, Ser. No. 841,527
Int. Cl. E21b 49/00
U.S. Cl. 73—152
25 Claims

ABSTRACT OF THE DISCLOSURE

In accordance with illustrative embodiments of the present invention, the parameters present in any formation can be determined and their percentages computed. To accomplish this, measurements of the acoustic travel time, hydrogen index, and bulk of a formation are obtained and used in a four-by-four matrix to determine the percentages of four formation parameters in a given formation. Since there are a great many possible formation parameters, these formation parameters are arranged in matrix sets where each matrix set can have any possible combination of four parameters. These matrix sets are ordered in accordance with their probability of occurrence in a given formation. The percent of the formation bulk volume contributed by each parameter in the first ordered set is computed and these computations tested for feasibility. If not feasible, the second most probable set is considered. This process continues until feasible computations are obtained whereupon the computations are recorded and the next formation depth level is considered. As an aid in determining the probability of occurrence and thus the order with which the sets are considered, measurements of one or more formation characteristics, including computations made from one or more derived measurements, can be used.

---

This invention relates to methods and apparatus for investigating earth formations traversed by a borehole. More particularly, the invention relates to the processing of well logging data derived from apparatus lowered in a borehole for investigating the subsurface earth formations.

In seeking to determine the presence and depth of hydrocarbon bearing zones (oil, gas, etc.) that may exist in the subsurface earth formations adjacent to a borehole drilled into the earth, various types of exploring devices may be lowered into the borehole for measuring various properties of the formation adjacent the borehole. The three principal types of such exploring devices are electrical exploring devices (either electrodes or induction coils), sonic exploring devices, and radioactivity exploring devices (gamma-ray, neutron, etc.).

The electrical exploring devices measure the electrical resistivities (or conductivities) of the earth formations. These electrical resistivities are determined primarily by the amount, distribution and resistivity of the fluid or fluids contained in the formation pore spaces. The sonic exploring devices, on the other hand, measure the time required for sonic waves to travel across a given span of the earth formation. This sonic travel time is determined primarily by the nature of the rock structure and particularly its porosity. The radioactivity exploring devices measure either the natural radioactivity of the formations or the radioactivity induced therein by bombardment of the formation with radioactivity particles or rays.

Two particular radioactivity exploring devices used to investigate formations are the formation density logging tool and the neutron logging tool. The formation density logging tool emits gamma-rays which are diffused through the formation and the number of diffused gamma-rays reaching one or more nearby detectors are counted to provide a measure of the electron density of the adjacent formation. Moreover, it is known that this electron density is very closely proportional to the bulk density of the formation in substantially all cases. (For cases where this proportionality does not apply, appropriate corrections can be made.)

The neutron tool, on the other hand, utilizes a source for emitting neutrons into the adjacent formations. In one form of neutron devices, these neutrons lose energy by collision with atoms in the formation. When the energy level of these neutrons is reduced to the epithermal energy range, they can be detected by a nearby detector, which counts the number of epithermal neutrons. Since hydrogen atoms are the only ones whose weights are almost equal to that of the neutron, they are the most effective in reducing the energy level of the neutrons to enable their capture. Thus, it can be said that this type of neutron log is essentially a record of the hydrogen atom density of the rocks surrounding the borehole. Since the formation pore spaces are generally filled by either water or liquid hydrocarbons which have about the same amount of hydrogen, the neutron log does not distinguish between oil and water, but is primarily affected by the formation porosity.

In general, none of these measurements taken alone give a direct and positive indication as to the presence or amount of hydrocarbons in the formations or the relative difficulty in removing these hydrocarbons. The various factors which affect each measurement have to be taken into account and an interpretation or deduction made as to the probable existence of hydrocarbons. Among the factors which are considered to be important in determining the location, amount, and ease of removal of oil are the porosity and lithology of the formations. Porosity is the fraction of the total volume of a given portion of the formation which is occupied by pores, or void spaces. Lithology, on the other hand, concerns the type of solid material (i.e., sandstone, limestone, dolomite, etc.) present in the formations.

It is known that by combining the measurements derived from the formation density log, the sonic log, and the neutron log, three independent measurements of certain physical properties of the formations can be obtained. Since the relationships for porosity and lithology for each of these logs are well known, simultaneous solutions of the equations for the three logging tools can be made to provide representations of porosity and lithology. Additionally, since it is known that the sum of all of the lithologic constituents plus porosity must equal one, there are in reality four equations and thus the solution of four unknowns can be obtained from such a four-by-four matrix. By so doing, solutions can be obtained for the percentage of volume of the formations contributed by the various formation parameters, i.e., in this case, the three lithologic constituents and porosity.

However, the accuracy of the above solution depends on the correct choice of the particular formation parameters which are to be used in the simultaneous solutions of the equations. While many times it may be known which parameters are present in the formations, there are many cases where this is not known. In this regard, it would be desirable to be able to accurately select the formation parameters which are to be used in the simultaneous solutions of the four equations. "Formation parameters" refer to the various constituents of a formation such as porosity or different minerals such as limestone, dolomite, shale, etc.

It is therefore an object of the present invention to provide new and improved methods and apparatus for processing well logging data derived from subsurface earth formation investigating apparatus to determine the make-up of the formations.

It is a further object of the present invention to provide new and improved methods and apparatus for determining the lithology and porosity of earth formations adjacent a borehole.

In accordance with one feature of the present invention, methods and apparatus for evaluating earth formations traversed by a borehole comprises deriving measurements of a plurality of characteristics of an earth formation and using these measurements to compute the portions of the earth formation made up of a first set of formation parameters. The feasibility of these computations are tested and if the computations are not feasible, the measurements are used to compute the portions of the formation made up of a second set of predetermined formation parameters. The sets of formation parameters are ordered in accordance with the probability of occurrence of the parameters of each set in the formation under investigation.

In accordance with another feature of the present invention, one or more derived measurements can be used as an aid in determining which set or groups of sets of formation parameters are most probable. This evaluation can be made prior to making the computations and the resulting feasibility testing, or it can be made after computations using one or more of the sets of formation parameters have been made.

For a better understanding of the present invention, together with other and further objects thereof, reference is had to the following description taken in connection with the accompanying drawings, the scope of the invention being pointed out in the appended claims.

Referring to the drawings:

FIGS. 1A and 1B show an investigating apparatus having a plurality of exploring devices for investigating the adjoining earth formations along with a schematic representation of apparatus for processing well logging signals derived from the investigating apparatus in accordance with the present invention;

FIGS. 4A and 4B show a flow diagram of the methods of the present invention for use in programming a general purpose digital computer.

Figure 1B:
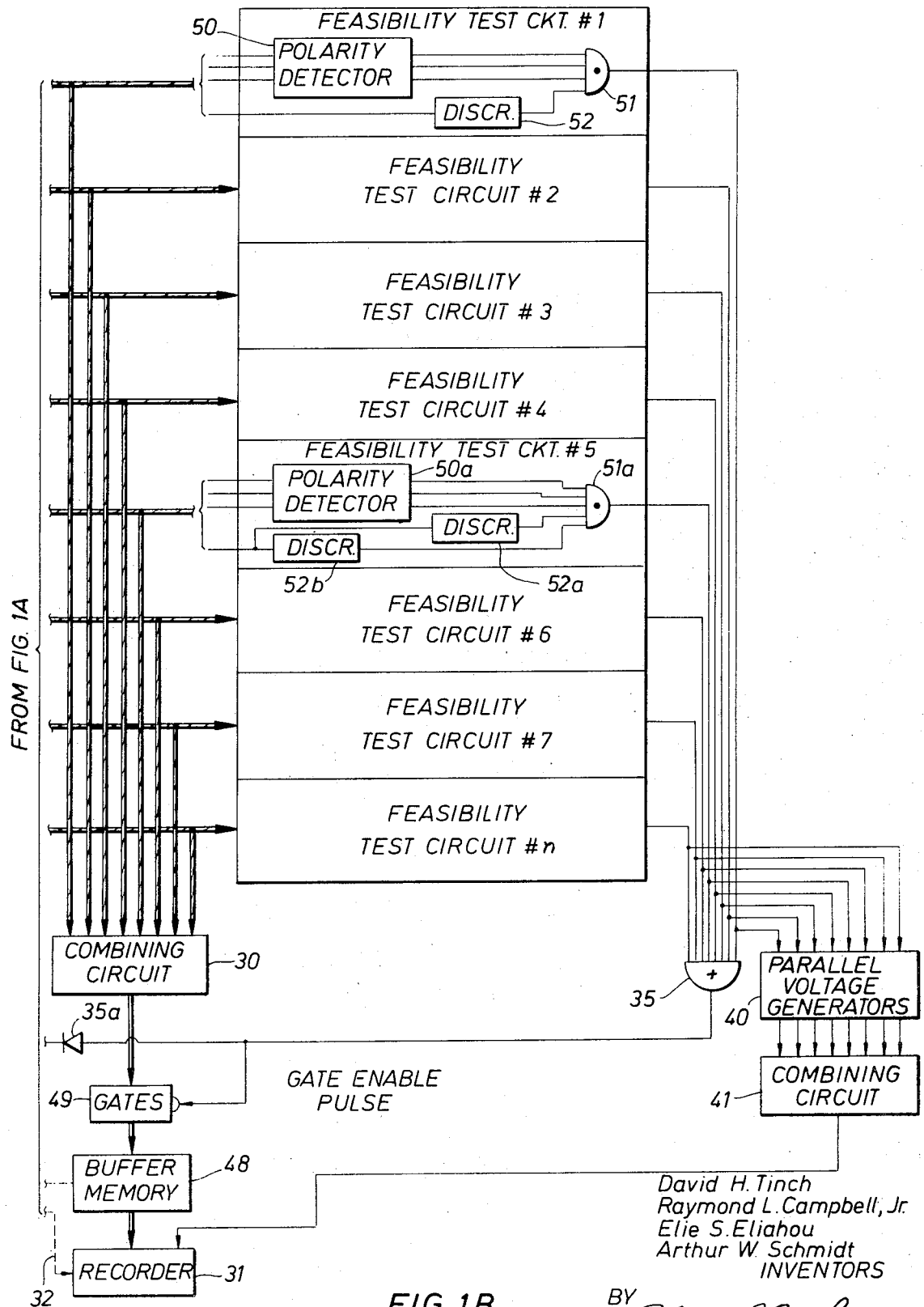

Now referring to FIG. 1, there is shown one embodiment of the present invention. To make a complete picture of FIG. 1, FIG. 1A is positioned to the left of FIG. 1B. FIGS. 1A and 1B will be collectively referred to as FIG. 1, an investigating apparatus 10 located in a borehole 11 on the end of an armored multiconductor cable 12 which is raised and lowered in the borehole by suitable drum and winch mechanism (not shown). The investigating apparatus 10 includes a suitable sonic exploring device 13 for measuring the acoustical travel time of the formations. Sonic exploring devices of this type can be found in U.S. Pat. No. 2,938,592 granted to C. J. Charske et al. on May 31, 1969 and U.S. Pat. No. 3,231,041 granted to F. P. Kokesh on Jan. 25, 1966. The downhole investigating apparatus 10 also includes a sidewall epithermal neutron exploring device 14, having a source and detector mounted on a skid 14a, for measuring the hydrogen content of the adjoining formations and thus the porosity of the adjoining formations. Exploring devices of this type can be found in U.S. Pat. No. 2,769,918 granted to C. W. Tittle on Nov. 6, 1956 and copending application Ser. No. 128,437 filed Mar. 26, 1971, which is a continuation-in-part of application Ser. No. 588,400 by Harold Sherman and Jay Tittman filed on Oct. 21, 1966, now abandoned.

If desired, a conventional neutron exploring device could be utilized in place of the sidewall epithermal neutron device. In such a neutron tool, neutrons emitted into a formation are captured by certain types of atoms in the formation which results in the emission of very high energy level gamma-rays, called capture gamma-rays. These capture gamma-rays are counted by a nearby detector. This type of neutron tool is also responsive to the hydrogen content of the formation.

The investigation apparatus 10 also includes a formation density exploring device 15 for producing well logging measurements which can be utilized to calculate the bulk density of the adjoining formations. In this regard, a skid 15a houses a source and two detectors spaced different distances from the source. This arrangement of source and detectors produces signals that correspond to the bulk density of the investigated earth formation. The theory, construction and operation of the gamma-ray measuring device 23 are described more completely in "Dual Spacing Formation Density Log" by J. S. Wahl, J. Tittman, C. W. Johnstone and R. P. Alger, Journal of Petroleum Technology, December 1964, pages 1411–1416; "The Physical Foundations of Formation Density Logging (Gamma-Gamma) by J. Tittman and J. S. Wahl, Geophysics, April 1965, pages 284–294; "Formation Density Log Applications in Liquid-Filled Holes" by R. P. Alger, L. L. Raymer, Jr., W. R. Hoyle and M. P. Tixier, Journal of Petroleum Technology, March 1963, pages 321–332; and U.S. Pat. No. 3,321,625 granted on May 23, 1967, to John S. Wahl and assigned to the same assignee as the invention described herein.

To keep the investigating apparatus 10 centered in the borehole, a pair of extendible wall-engaging members 14b and 15b are provided opposite the pad members 14a and 15a. To keep the upper portion of the investigating apparatus 10 centered, a plurality of spacers 16 are provided. A borehole caliper also is combined with the arms which extend the skids 15a and 15b and supplies a signal representative of borehole diameter to the surface of the earth.

The signals derived from the downhole investigating device are applied to a signal processing circuit 17 which operates to prepare the signals for use by the remainder of the surface processing circuitry, including referencing all of these signals to the same depth level. The signal processing circuits also operate to compute the neutron derived porosity $\phi_N$ produced by the neutron logging device and the bulk density $\rho_B$ produced in response to certain signals from the formation density logging tool 15. The output signal from circuits 17 are $\phi_N$, $\rho_B$ and the acoustic travel time $\Delta t$.

It has been the practice in the past for the well logging analyst to utilize the sonic travel time measurement $\Delta t$, the neutron derived porosity measurement $\phi_N$, and the formation density derived measurement for bulk density $\rho_B$ to solve for a more accurate porosity. Additionally, these measurements have been used to solve for percentages of a limited number of lithological constituents of the adjoining formations. How this can be accomplished can be easily explained by writing the equations for $\rho_B$, $\Delta t$ and $\phi_N$ in terms of the porosity and different lithological constituents. These equations are:

$$k_1 \Delta t = P_1 \Delta t_1 + P_2 \Delta t_2 + P_3 \Delta t_3 + P_4 \Delta t + \ldots + \quad (1)$$
$$k_2 \phi_{N(LMS)} = P_1 H_1 + P_2 H_2 + P_3 H_3 + P_4 H_4 + \ldots \quad (2)$$
$$k_3 \rho_B = P_1 \rho_1 + P_2 \rho_2 + P_3 \rho_3 + P_4 \rho_4 + \ldots \quad (3)$$

Where the symbols $P_1$, $P_2$, and $P_3$ represent the percentages of bulk volume of various formation parameters and the corresponding subscripts 1, 2, 3, and 4 correspond to the response of the particular exploring device to that particular formation parameter, e.g., primary or secondary porosity or a particular mineral. $k_1$, $k_2$, and $k_3$ are calibration constants determined by such things as the tool response. The LMS subscript for $\phi_N$ specifies that the tool is calibrated to zero response in limestone. Thus, for example, $\Delta t_1$ is the sonic response to the No. 1 formation parameter. $H_1$ is the hydrogen index of the No. 1 parameter. $\rho_1$ is the density of the No. 1 mineral, etc. All of these factors ($\Delta t_1$, $H_2$, $\rho_3$, etc.) are expressed for a given geographical location. They may vary by horizons (depth), but are generally always known at the well site before beginning the logging run. The $+ \ldots$ represents the fact that there are numerous other materials which may be part of Equations 1, 2, and 3. It can also be stated that the sum of the percentages of bulk volume of all of the formation parameters must equal one. Thus:

$$P_1 + P_2 + P_3 + P_4 + \ldots = 1 \qquad (4)$$

Thus, it can be seen that there are four equations, and thus the solution to four unknowns can be provided by simultaneously solving Equations 1 through 4. All other formation parameters besides four have to be assumed to be nonexistent in the formation. Thus, rewriting Equations 1 through 4 in terms of only four formation parameters:

$$k_1 \Delta t = P_1 \Delta t_1 + P_2 \Delta t_2 + P_3 \Delta t_3 + P_4 \Delta t_4 \qquad (5)$$
$$k_2 \phi_{N(LSM)} = P_1 H_1 + P_2 H_2 + P_3 H_3 + P_4 H_4 \qquad (6)$$
$$k_3 \rho_B = P_1 \rho_1 + P_2 \rho_2 + P_3 \rho_3 + P_4 \rho_4 \qquad (7)$$
$$P_1 + P_2 + P_3 + P_4 = 1 \qquad (8)$$

For the solution of this 4 by 4 matrix described by Equations 5 through 8 to be accurate, the four formation parameters represented by the subscripts 1, 2, 3 and 4 must be chosen properly. If a wrong assumption is made as to this, the results may very well be completely inaccurate. One reason for this is that the constants (i.e., $\Delta t_1$, $\phi_N$, $\rho_3$, etc.) are different for each formation parameter. In addition to the percentage errors, of course, the answer provided by the logging analyst will include a wrong formation parameter.

In accordance with the present invention, a technique has been found that will accurately determine what parameters should be used in Equations 1–4. In accordance with this new technique, a plurality of sets of four formation parameters are arranged in the order of their probable occurrence. Each of these sets of four formation parameters is called a "matrix set." Starting with the first most probable matrix set, the percentage of each parameter of the matrix set is computed and tested for feasibility. If the solution to the first most probable matrix set appears to be reasonable, the bulk volume percentage of each formation parameter is read out for recording. If, one the other hand, the answers provided by the first most probable matrix set appear improbable, the second most probable matrix set is chosen and the matrix is solved for the percentage of each parameter of the second matrix set. The answers provided by the second matrix set are then checked for feasibility and if feasible, are read out for recording. If they do not appear feasible, the third probable matrix set is selected. This procedure continues until answers which appear to be feasible are found.

Since there are so many different parameters which can be found in earth formations, such as different types of minerals, porosity and fluid, information derived from logging tools others than those which produce the input data to the matrix sets, i.e., $\Delta t$, $\phi_N$, and $\rho_B$, are used as an aid in determining which matrix sets are most probable. Thus, for example, the spontaneous potential, natural radioactivity, or anything else can be measured at each depth level as an aid in determining which matrix sets are most probable. Taking a specific example of this, if the spontaneous potential is greater than a given critical value, it is likely that the formation is a porous and permeable sand. On the other hand, if the measured spontaneous potential is below a given critical value, it is reasonably certain that the formation is a shale formation. As a further example, if there is no measured spontaneous potential, then it has been found that water-filled porosity values in excess of a given critical value, e.g., 8%, are unlikely and it can therefore be reasonably assumed that the wrong matrix set has been selected if such high porosity values are computed.

Referring back to FIG. 1, the well logging measurements $\Delta t$, $\phi_N$, $\rho_B$ from signal processing circuit 17 are applied to matrix computers 1 through $n$ by way of a plurality of gates 19–26. To energize these gates 19–26, a counter 27 is energized by clock pulses generated by a clock or oscillator 38. The clock pulses pass through a gate 37 upon depth pulses from a depth pulse generator 28 setting a flip-flop 36. The depth pulse generator 28 includes a rotating wheel 29 which is in engagement with the cable 12 whereby the depth pulse generator 28 will generate a depth pulse for each given increment of travel of the cable 12.

The clock pulses from clock 38 and gate 37 are counted by the counter 27 so that the counter will sequentially produce output signals on the output terminals designated, 1–$n$. These output signals are utilized to energize the gates 19–26 in sequence so that the well logging measurement signals $\Delta t$ $\phi_N$ and $\rho_B$ will be sequentially applied to each matrix computer in sequence. The matrix computers 1–$n$ solve for the percentage that each formation parameter of the particular matrix set contributes to the total bulk volume of the formations. The four output signals from each matrix computer are applied to a combining circuit 30 for application to a buffer memory 48 via parallel gates 49. The gates 49 are energized by a "gate enable pulse" and, when energized, apply signals to the buffer memory 48 which stores them for application to a recorder 31. Each channel of the memory 48 stores an applied signal until updated by a new signal from one of the matrix computers via gates 49. The recorder 31 is driven by a shaft 32 rotated by a rotating wheel 33 in engagement with the cable 12 so that the stored signals in buffer memory 48 will be recorded by recorder 31 as a function of borehole depth. Since only one matrix computer at a time can be producing output signals due to the action of the gates 19–26 and counter 27, the combining circuit 30 connects the similarly designated output terminals of each matrix computer together so that only four signals at a time will be applied to buffer memory 48. That is, the parameter No. 1 ($P_1$) output terminal from each matrix computer is connected together, etc. If desired, the combining circuit 30 can also provide suitable isolation between the outputs of each matrix computer.

The output signals from the matrix computers 1–$n$ are also applied to a plurality of feasibility test circuits, numbered 1 through $n$ respectively to correspond with the matrix computer designations. These feasibility test circuits operate to check the answers provided by each indivdual matrix computer and determine whether they are feasible. If the answers are feasible, the particular feasibility test circuit corresponding to the matrix computer whose output signals are under test, generates an output signal via an OR gate 35 and diode 35$a$ which resets the counter 27 to zero and resets the flip-flop 36. Since the well logging measurements $\Delta t$, $\phi_N$, and $\rho_B$ are applied to each matrix computer in sequence, the computed answers produced by each matrix computer will also be sequentially supplied to the corresponding feasibility test circuits.

Since the counter 27 and flip-flop 36 are reset whenever the answers provided by one of the matrix computers are feasible, it can be seen that the system, starting with the most probable matrix set, will compute the percentages of bulk volume of the formation parameters for each matrix set in sequence until feasible answers are obtained at which time the entire system is reset in readiness for the next depth pulse from the depth pulse generator 28.

The output signals from each of the feasibility test circuits 1 through $n$ are also applied to a plurality of parallel voltage generators 40 which each operate to generate a voltage having an amplitude which is unique to each of the matrix sets 1–$n$. Thus, for example, an output signal from the feasibility test circuit No. 1 could cause a signal of 1 volt to be generated, the feasibility test circuit No. 2 could cause 2 volts to be generated, etc. The output conductors from the parallel voltage generator 40 are applied to a suitable combining circuit 41 for application to the recorder 31. By this arrangement, a signal having an amplitude representative of which matrix set has been selected by the system will be used or recorded by the recorder 31.

As stated earlier it may be desirable to utilize information from various logging tools as an aid in determining which matrix set is applicable to any given formation depth level. For example, spontaneous potential measurements, gamma-ray measurements, resistivity measurements, etc., could be utilized as an aid in determining which matrix set is to be selected. In FIG. 1, as an example, the spontaneous potential measurement is utilized as an aid in determining which matrix set is to be selected. To this end, the signal processing circuits 17 produce a spontaneous potential measurement, designated SP, which is applied to a voltage discriminator 45. The discriminator 45 determines if the SP voltage is equal to or less than a selected critical or cut-off value. If the SP measurement is equal to or less than this critical SP value, a signal is generated from the discriminator 45 and applied via an AND gate 46 to the counter 27 to set it to a desired advanced state. The other input to the AND gate 46 is derived from the depth pulse generator 28 so that the counter 27 can only be set to the advanced state at the initiation of each sequence of operation of the system and not in the middle of a sequence of operation. (A sequence of operation is defined as the entire operation by the FIG. 1 system between consecutive depth pulses, i.e., the entire operation at one depth level.)

As an aid in understanding how the system of FIG. 1 operates, it would be desirable to consider specific examples of commonly found matrix sets. Thus, referring to Table I below, there is shown the formation parameters:

comprised of porosity should not be negative either thus giving rise to another feasibility test. It has been found, however, that some small statical variation of the porosity percentage below zero percent can be tolerated without unduly affecting the overall accuracy of the computations.

To accomplish the above objects with the FIG. 1 system, the parameters 2–4 output signals from matrix computer No. 1 are applied to parallel polarity detectors 50 which will individually generate an output signal whenever the corresponding input signal is zero or positive. These output signals from polarity detectors 50 are applied to an AND gate 51. Parameter No. 1, which from Table I, is water-filled porosity, is supplied to a voltage discriminator 52 which operates to generate an output signal when the water-filled porosity is above a given negative voltage level. The output signal from the discriminator 52 is also applied to the AND gate 51. The output signal from AND gate 51 constitutes the output signal from the feasibility test circuit No. 1. This output signal is applied to the OR gate 35 and a parallel voltage generator 40. If the computations made by matrix computer No. 1 are deemed to be feasible, the feasibility test circuit No. 1 will generate an output signal via OR gate 35 to energize the gate 49 and thus apply the output signals from matrix computer No. 1 to the buffer memory 48. The output signal from feasibility test circuit No. 1 also resets the counter 27 to its "0" state and resets the flip-flop 36 so as to inhibit the clock pulses from further advancing the counter 27. The output signal from feasibility test circuit No. 1 also energizes a selected voltage generator of the parallel voltage generator 40 so as to cause a signal having a given amplitude to be applied to the recorder 31 to indicate the fact that matrix set No. 1 has been selected by the system. The system then waits for the next depth pulse to perform the same operation from well logging measurements derived at the next depth level.

TABLE I

| Matrix | Parameter 4 | Parameter 3 | Parameter 2 | Parameter 1 |
|---|---|---|---|---|
| 1 | Laminated shale | Volcanic | Quartz | Water-filled porosity. |
| 2 | do | Dispersed clay | do | Do. |
| 3 | Quartz | Volcanic | Gas-filled porosity | Do. |
| 4 | Laminated shale | do | Coal | Do. |
| 5 | do | do | Quartz | Do. |
| 6 | do | do | Coal | Do. |
| 7 | do | Dispersed clay | Quartz | Do. |
| n | do | do | Coal | Quartz |

The first four matrix sets correspond to porous and permeable sands which are usually indicated when the SP amplitude is above a given crtical or cut-off value. The matrix sets 5, 6, 7 and n correspond to shaly formations which are usually indicated when the SP is below this cut-off value.

Now concerning the operation of the system of FIG. 1 when utilizing the example of Table I, the SP discriminator 45 checks to determine if the SP voltage is equal to or less than the critical voltage $SP_c$. Assuming that the SP voltage is greater than $SP_c$, the AND gate 46 will remain disabled and the depth pulse from depth pulse generator 28 will not pass to counter 27. The depth pulse will however set the flip-flop 36 so as to open the gate 37 and allow clock pulses from the clock 38 to advance the counter to its 1 state thus energizing the gates 19 reset to its zero state, the first clock pulse will advance the counter to its 1 state thus energizing the gates 19 and passing the well logging measurements $\Delta t$, $\phi_N$ and $\rho_B$ to the matrix computer No. 1. Matrix computer No. 1 computes the percentages of each parameter in accordance with Equations 5–8 and generates four output signals representative of these percentages.

From Table I, it can be seen that parameters 2–4 are minerals. Since there cannot be a negative percentage of any mineral, the parameters 2–4 output signals from matrix computer No. 1 are tested for negative polarity. Furthermore, the percentage of the formation volume If one or more of the output signals from matrix computer No. 1 had failed to satisfy the feasibility test applied by feasibility test circuit No. 1, the next clock pulse from clock 38 would have advanced the counter to state No. 2 so as to energize the gates 20 and thus enable matrix computer No. 2 to operate. The feasibility test circuit No. 2 then checks the feasibility of the computations made by matrix computer No. 2 and initiates the reset of the system and read out of the computations to recorder 31 if the computations are feasible. If the computations are not feasible, the system is allowed to continue to matrix computer No. 3.

At this point, a decision must be made whether to proceed to matrix set No. 3 or to bypass this set to go to matrix set No. 4. From Table I, it can be seen that parameter No. 2 is gas-filled porosity in matrix set No. 3 and coal in matrix set No. 4. To determine which matrix set to choose, the value of the lithology indicator "N" is computed by a computer 55. The definition of "N" and the construction of this N computer can be found in U.S. Pat. No. 3,590,228 issued to J. A. Burke on June 29, 1971. If the computed value of N is below a given critical or cutoff value $N_c$, it has been found that it can reasonably be assumed that there is a greater likelihood of gas being present in the formation than coal and thus matrix No. 3 is selected. If, on the other hand, N is greater than $N_c$, there is a greater likelihood of coal being present in the formation and thus matrix No. 4 is selected.

To accomplish this selection process in the system of FIG. 1, the computed value of N from the N computer 55 is applied to a voltage discriminator 56 which generates an output signal only if N is less than $N_c$. In this event, the discriminator 56 enables an AND gate 57 to pass the gate control signal from counter 27 to the gates 21 so as to enable matrix computer No. 3 to operate. On the other hand, if N is greater than $N_c$, the output voltage from the discriminator 65, which will be zero, enables an AND gate 58 via a voltage inverter 59. Once AND gate 58 is enabled, the No. 4 output signal from counter 27 enables the gates 22 so as to allow the matrix computer No. 4 to operate. The feasibility test circuits No. 3 and No. 4 operate in a similar manner to the feasibility circuits No. 1 and No. 2 and thus need not be discussed.

If no feasible answers have been produced by the first four matrix sets, the system reads out to the recorder 31 the computations stored in the buffer memory 48 from the last depth level where feasable answers were obtained and resets the counter 27 and flip-flop 36 in readiness for another depth pulse from depth pulse generator 28. This is accomplished in FIG. 1 by the counter 27 producing an output signal at the output terminal 4A after the first four matrix sets have been considered. This output signal on output terminal 4A operates to reset the counter 27 and the flip-flop 36. The diode 35a prevents the gates 49 from being energized and since buffer memory 48 contains all of the data computed at the last depth level, the data fed to the recorder 31 will be the computations made at the last depth level where feasible answers were obtained.

When using matrix computers 1 through 4, it is assumed that the SP voltage is greater than $SP_c$. Assume now that SP is equal to or less than $SP_c$. In this event, the AND gate 46 will be enabled and each depth pulse from depth pulse generator 28 will set the counter 27 to the No. 5 state so that the first four matrix computers will be bypassed and matrix set No. 5 will be the first matrix set to be considered. Thus, in this event, the No. 5 terminal of counter 27 generates a signal which energizes the gates 23 to enable the matrix computer No. 5 to operate. The computations produced by matrix computer No. 1 are tested by the feasibility test circuit No. 5. In addition to the tests made by the feasibility test circuit No. 1, the feasibility test circuit No. 5 also checks to determine if the water-filled porosity $\phi_w$ is greater than some cut-off value, say 8%, and if so, the computations made by matrix computer No. 5 are deemed to be not feasible. The reason for this is that it has been found that if SP is less than $SP_c$ and $\phi_w$ is greater than the $\phi_w$ (cut-off value), designated $\phi_{wc}$, the computations are probably inaccurate.

In the feasibility test circuit No. 5, the parameter Nos. 2, 3 and 4 output signal from matrix computer No. 5 are applied to polarity detectors 50a and the parameter No. 1 signal is applied to a discriminator 52a. These circuits 50a and 52a operate in the same manner and for the same purpose as circuits 50 and 52 of feasibility test circuit No. 1. In addition to the circuits of feasibility test circuit No. 1, feasibility test circuit No. 5 also includes a discriminator 52b which generates an output signal only when the water-filled porosity value $\phi_w$ is greater than $\phi_{wc}$. The output signals from polarity detectors 50a and discriminators 52a and 52b are applied to the input of an AND gate 51a whose output signal constitutes the output signal from feasibility test circuit No. 5.

If the computations made by matrix computer No. 5 are feasible, the system is reset and the buffer memory 48 updated, as before. If not feasible, the system proceeds to matrix computer No. 6 whereupon the percent of bulk volume of the formation parameters listed for matrix No. 6 in Table I are computed. If the computations produced by matrix computer No. 6 are not feasible, the system proceeds from one matrix computer to another until it either finds feasible answers or reaches matrix computer No. $n$. From Table I, it can be seen that quartz has been substituted for water-filled porosity in matrix No. $n$. In other words, the system has by this time tried every possible combination of parameters and is now ready to assume that porosity is insignificant as compared to a selected mineral (in this case, quartz) at the particular depth level being considered. If matrix computer No. $n$ does not produce feasible answers, the counter 27 will advance to the $n+1$ state and reset the system in readiness for the next depth pulse from depth pulse generator 28. The diode 35a prevents the gates 49 from being energized and thus buffer memory 48 would not be updated since valid answers were not obtained for the depth level under consideration.

If desired, the buffer memory 48 could be reset to zero whenever feasible answers are not obtained. This is represented in FIG. 1 by the dotted line connecting terminals 4a and $n+1$ of counter 27 to the reset input of buffer memory 48. In this event, suitable isolation diodes would be necessary to prevent an output signal from OR gate 35 from resetting the memory.

Additionally, any well logging measurement could be utilized to aid in determining which matrix set or group of matrix sets are most probable. The present invention is not limited to just the examples using SP and N which were discussed above. Thus, for example, as illustrated in dotted line form in FIG. 1, a gamma-ray measurement could be made and if greater than some critical value $GR_c$, the system could be made to consider some predetermined group of matrix sets.

Figure 2:
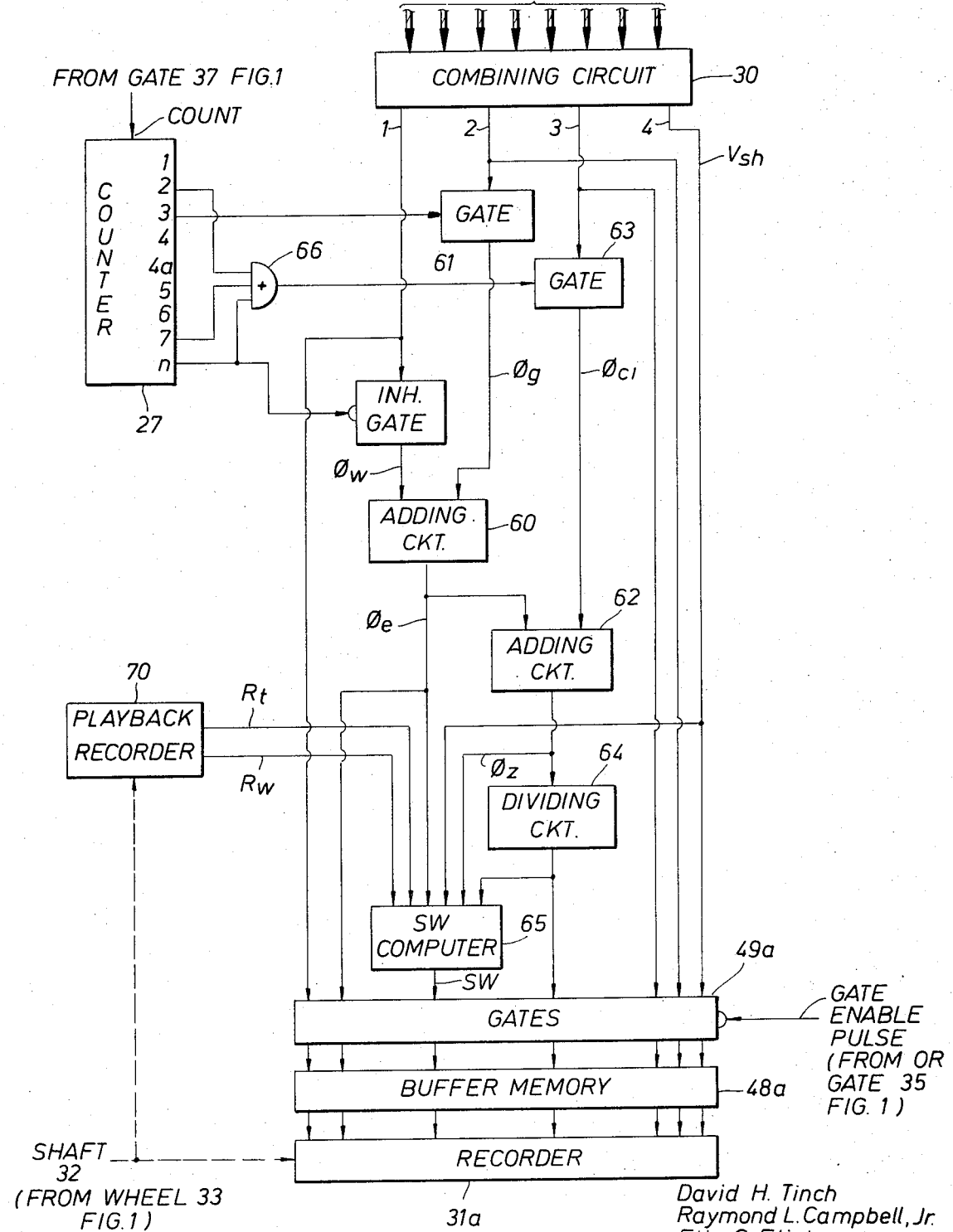
FIG. 2 shows data processing circuitry which can be used with the apparatus of FIG. 1.

Turning now to FIG. 2, there is shown apparatus which can be added onto the system of FIG. 1 to compute various desirable parameters in addition to those already discussed. These additional parameters are effective porosity $\phi_e$; the percentage of the total porosity filled with clay, designated $q$; and the water saturation $S_w$. This added on circuitry of FIG. 2 is located between the output of the combining circuit and the gates 49, In FIG. 2, the gates 49, buffer memory 48 and recorder 31 are designated 49a, 48a and 31a respectively (instead of 49, 48, and 31) to indicate the fact that more signals are being processed. Otherwise, these three devices are the same as in FIG. 1. The gates 49a are energized by the same "gate enable pulse" which enables the gates 49 in FIG. 1. The counter 27 is the same as the similarly designated element of FIG. 1. The remainder of the FIG. 1 circuitry has been omitted as being unnecessary to the explanation of FIG. 2 but is nevertheless assumed to be part of the FIG. 2 circuitry. Thus, the counter 27 is energized and reset in the same manner as in FIG. 1 and the combining circuit 30 derives its input signals in the same manner as in FIG. 1.

To compute the effective porosity, the system of FIG. 2 combines the water-filled porosity $\phi_w$ and the gas-filled porosity $\phi_g$ in accordance with the following expression:

$$\phi_e = \phi_w + \phi_g \tag{9}$$

The expression for the percentage of total porosity filled with clay is:

$$q = \frac{\phi_{cl}}{\phi_{cl} + \phi_w + \phi_g} \tag{10}$$

The equation for the water saturation $S_w$ is:

$$S_w = \frac{.5}{\phi_e}\left[-q\phi_z + \sqrt{(q\phi_z)^2 + \frac{3.24\, R_w}{R_t}(1-V_{sh})1 - \frac{V_{sh}R_t}{R_{sh}}}\,\right] \tag{11}$$

where $$\phi_z = \phi_{cl} + \phi_w + \phi_g \tag{12}$$

$V_{sh}$ is the bulk volume of laminated shale, and
$R_{sh}$ is the true resistivity of the shale lamina.

The Nos. 1–4 parameters from combining circuit 30 are all applied to the gates 49a for application to the buffer memory 48a and recorder 31 in the same manner as in FIG. 1. In FIG. 2, to compute the value of effective porosity $\phi_e$, the No. 1 parameter from combining circuit 30 is applied to an adding circuit 60. The No. 2 parameter is gated to the adding circuit 60 during period 3 (corresponding to matrix No. 3) by the No. 3 output signal from counter 27 energizing a gate circuit 61. As seen from Table I, gas-filled porosity is a formation parameter used only in matrix No. 3 during period 3. Thus, adding circuit 60 combines $\phi_w$ and $\phi_g$ in accordance with Equation 9 to produce a signal proportional to the effective porosity $\phi_e$ for application to the gates 49a. In the event that a matrix other than matrix No. 3 is used, $\phi_g$ will be zero and thus $\phi_w$ will be equal to $\phi_e$.

To compute the percentage of the total porosity filled with clay ($q$), parameter No. 3 is gated to an adding circuit 62 by a gate 63 only during periods 2, 7 and $n$. From Table I, parameter 3 of matrixes 2, 7 and $n$ is the dispersed clay indication $\phi_{cl}$. Additionally, the effective porosity $\phi_e$ from adding circuit 60 is applied to the adding circuit 62 so that the output signal from adding circuit 62 will be proportional to the total porosity $\phi_z$. This total porosity indication $\phi_z$ is divided into the clay porosity indication $\phi_{cl}$ by a dividing circuit 64 in accordance with Equation 10 to produce a signal proportional to $q$ for application to the gates 49a. In accordance with Equation 11, the quantities $q$, $\phi_z$, and $\phi_e$ are applied to an $S_w$ computer 65. Additionally, the percentage of parameter No. 4, which from Table I is the bulk volume of laminated shale ($V_{sh}$) during all periods, is also applied to the $S_w$ computer 65. Of course, if parameter No. 4 were something other than laminated shale during some periods of operation, parameter No. 4 from combining circuit 30 could be gated to the $S_w$ computer 65 during only those pertinent periods of operation.

To supply the values of $R_t$ and $R_w$ to the $S_w$ computer 65, a playback recorder 70 which had previously recorded values of $R_t$ and $R_w$ during a previous logging run, is driven by the shaft 32 so as to generate values of $R_t$ and $R_w$ in synchronism with the movement of the exploring device 10 through the borehole. The computed value of $S_w$ from computer 65 is also applied to the gates 49a for application to buffer memory 48 at the proper time.

As in the FIG. 1 system, the "gate enable pulse" generated from the OR gate of FIG. 1 energizes the gates 49a to enable the buffer memory 48a to store the signals from the gates 49a for application to the recorder 31. As in the FIG. 1 system, if feasible results cannot be obtained, the gates 49a will never be energized and the buffer memory 48a will not be updated.

Figure 3:
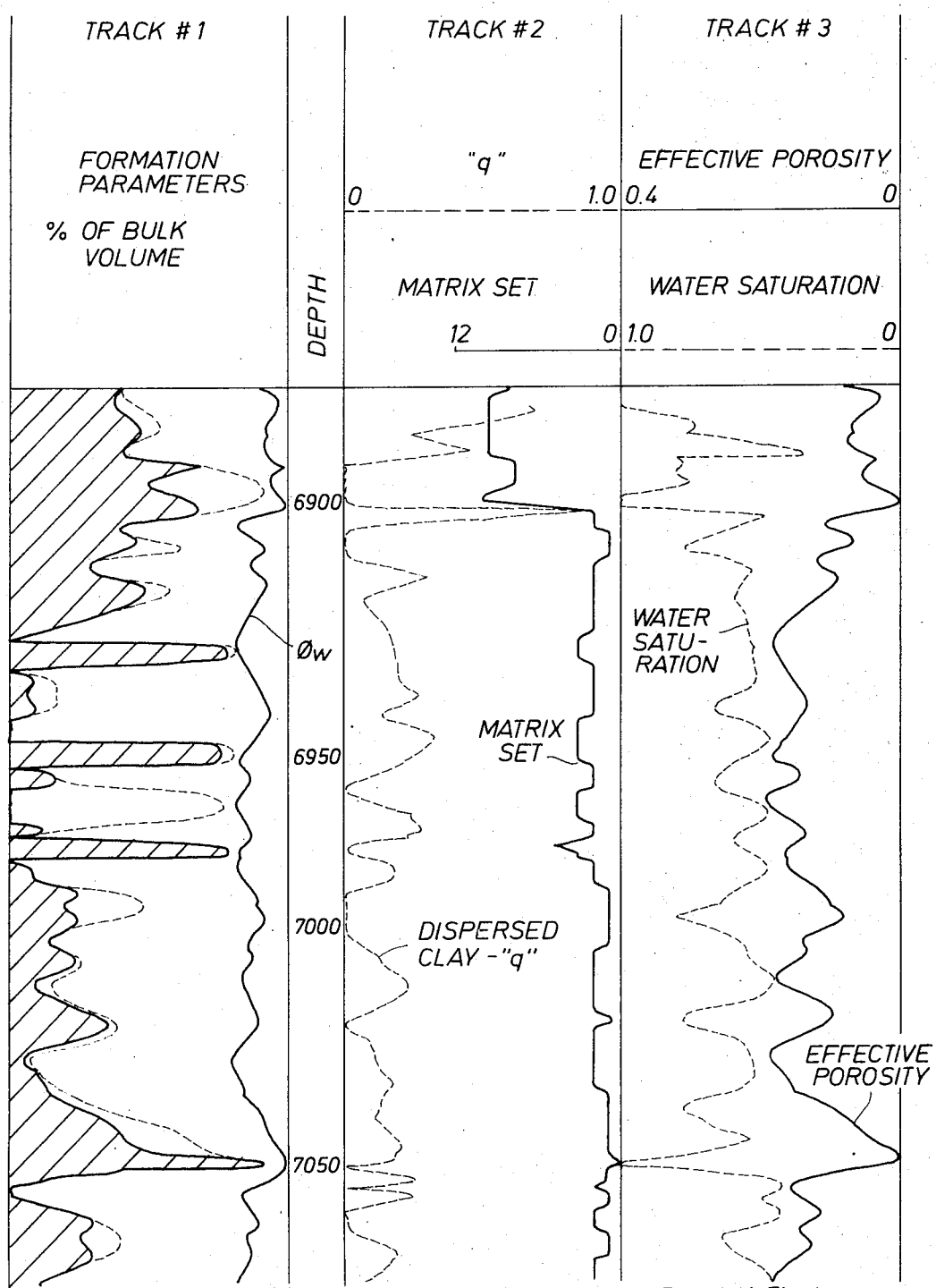
FIG. 3 shows typical recorded logs that could be expected when using the methods and apparatus of the present invention.

Now turning to FIG. 3, there are shown examples of typical logs which could be produced by the system of FIGS. 1 and 2. In FIG. 3, track 1 is a log of the percent of bulk volume of each of the formation parameters listed in Table I. The bulk volume of laminated shale is the cross hatched portion of the log. The curve on the extreme right-hand side of the log is water-filled porosity $\phi_w$.

To determine which parameters are being recorded in track 1, there is a "matrix set log" recorded in track No. 2. This matrix set log is the solid line curve in track No. 2. The voltage level of this matrix set log is indicative of which matrix set is being recorded at any given depth level in track 1. Also recorded in track 2 is the dispersed clay "$q$" curve which, as stated earlier, is representative of that fraction of the total porosity which is filled with clay. The effective porosity $\phi_e$ and water saturation $S_w$ logs are recorded in track 3 to complete the picture of the makeup of the earth formations under investigation. How these logs can be utilized as an aid in evaluating earth formation is well known and need not be discussed here.

Figure 4B:
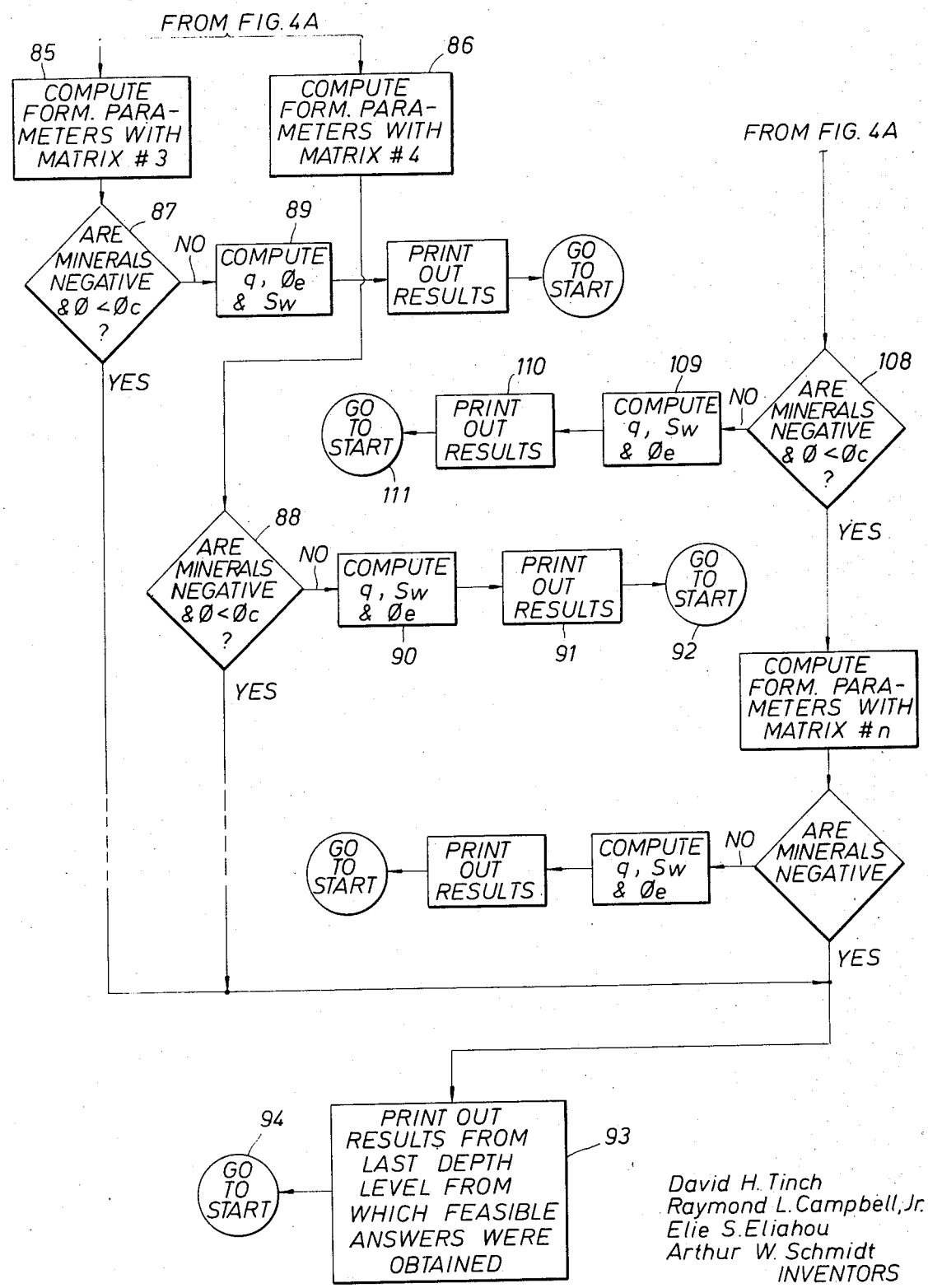

Now turning to FIGS. 4A and 4B, there is shown a flow chart representation of the techniques of the present invention which flow chart could be utilized to program a general purpose digital computer (FIG. 4A fits on top of FIG. 4B to make a complete diagram of FIG. 4. Hereafter, FIGS. 4A and 4B will be referred to as FIG. 4). In FIG. 4, the constant formation parameters are read as represented by the box 70. These formation parameters comprise, for example, the acoustic travel time of the formation fluids, the hydrogen index of the fluids, the water resistivity, etc. Next, the well logging measurements $\Delta t$, $\rho_B$, $\phi_N$ and SP are read for a given depth level, as represented by the block 71. Next, a test is made to determine if SP is equal to or less than the critical SP value, as represented by the decision block. If SP is not equal to or less than $SP_c$, the percentage of the formation parameters are computed in accordance with matrix No. 1 of Table I, as indicated by the block 73. As indicated by the decision block 74, a test is then made to determine if the computations for parameters 2–4 are negative and if the water-filled porosity $\phi_w$ is less than the critical value of water-filled porosity $\phi_{wc}$. If not, the values of $S_w$, $q$ and $\phi_e$ are computed in accordance with Equations 9, 10 and 11, as indicated by the block 75. As indicated by the block 76 and circle 77, the results are then printed out and the system goes back to start. Since the so-called "constant formation parameters" are generally constant over large sections of the borehole, the system could be made to omit the box 70 until reaching a depth level where new "constant formation parameters" are called for.

If the decision block 74 indicates "yes," the percentage of the formation parameters are computed with matrix No. 2 of Table I, as indicated by block 78. As indicated by decision block 79, the feasibility of the answers provided from matrix No. 2 are tested. If feasible, the values of $q$, $\phi_e$, and $S_w$ are computed and the results of this computation as well as the percentages of bulk volume percentage of each of the formation parameters are printed out and the system goes back to start to perform the operation again for the next depth level, as indicated by elements 80, 81 and 82.

If the answer from decision block 79 is yes, the lithology indicia "N" is computed as represented by the block 83. Next, as indicated by the decision block 84, this value of N is checked to determine if it is greater than the critical value of $N_c$. If N is less than $N_c$, the formation parameters are computed with matrix No. 3 of Table I as represented by the block 85. If N is greater than $N_c$, the formation parameters are computed with matrix No. 4 as represented by the block 86. In both cases, the feasibility of the results are checked as indicated by decision blocks 87 and 88 and the computed formation parameters $q$, $\phi_e$ and $S_w$ are computed as represented by the blocks 89 and 90. In both cases the results are printed out and the system proceeds back to start if feasible answers were obtained. If not, the system proceeds from one matrix to the next using as many ancillary tests (e.g., $SP \geq SP_c$, $GR \geq GR_c$, $N \geq N_c$) as are necessary or desirable. If no feasible answers are obtained, the results from the last depth level which produced feasible results are printed out and the system goes back to start, as represented by elements 93 and 94.

Referring back to the decision block 72, if SP was equal to or less than $SP_c$, the percentage of formation parameters are computed with matrix No. 5 of Table I as represented by the block 95. As represented by the decision block 96, the formation parameters are checked to determine if the parameters 2–4 are negative and if $\phi_w$ is less than $\phi_{dc}$. If these tests are satisfied, a test is made to determine if $\phi_w$ is greater than the upper limit value of $\phi_w$, ($\phi_{w(max)}$), as represented by the decision block 105. If not greater, $q$, $\phi_e$ and $S_w$ are computed, the results printed out, and the system goes back to start as represented by elements 97, 98 and 99. If, on the other hand, any one of these feasibility tests was failed, the percentages of formation parameters are computed with matrix No. 6 as represented by block No. 100. Again, the computed answers are tested for feasibility as represented by the decision block 101 and if feasible, $S_w$, $q$ and $\phi_e$ are computed, the results printed out and the system proceeds back to start, as represented by elements 102, 103 and 104.

If the percentages of formation parameters computed with matrix No. 6 fail to pass the feasibility test, the formation parameters are computed with matrix No. 7 of Table I as represented by block 107 and checked for feasibility by the decision block 108. If the answers are feasible, $q$, $\phi_e$ and $S_w$ are computed, the results printed out and the system goes back to start as represented by elements 109, 110 and 111. If the results were not feasible, the system can continue using other matrixes, or other tests, until either feasible answers are obtained or the system reaches matrix N and still cannot find feasible answers. In this event, as represented by block 93 and circle 94, the results from the last depth level which produced feasible results are used and the system goes back to start.

It can be seen from the foregoing description that a technique has been set forth for determining the parameters of a formation and computing what portion of a formation is contributed by each parameter. In accordance with the present invention, this has been accomplished by determining the makeup of any given formation by using matrix sets of four parameters each which sets are arranged in the order of probability of their occurrence in any given formation. By checking the feasibility of the computations produced by each matrix set and proceeding to the next matrix set if the results are not feasible, as well as by utilizing measurements of various other formation parameters as an aid in selecting the proper matrix, it is possible to accurately determine the parameters of any given formation and compute their percentage contribution to such a formation.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A machine operated method of evaluating earth formations traversed by a borehole, comprising:

deriving measurements of a plurality of characteristics of an earth formation;

supplying said measurements to a machine to compute the portions of said earth formation made up of a first set of formation parameters;

testing the feasibility of said formation parameter portion computations; and using said measurements to compute the portions of said formations made up of a second set of predetermined formation parameters if the computations using said first set are not feasible; and testing the feasibility of said second set formation parameter computations whereby the true formation parameters will be considered to be said first set if said first set computations are feasible and said second set if said first set parameter computations are not feasible and said second set computation are feasible.

2. A machine operated method of evaluating earth formations traversed by a borehole, comprising:

deriving measurements of a plurality of characteristics of an earth formation;

supplying said measurements to a machine to compute the portions of said earth formation made up of a first set of formation parameters;

testing the feasibility of said formation parameter portion computations;

using said measurements to compute the portions of said formations made up of a second predetermined set of formation parameters if the computations using said first set are not feasible;

testing the feasibility of said second set formation parameter computations, and recording the formation parameter portion computations from whichever set, if any, that produced feasible computations.

3. A machine operated method of evaluating earth formation traversed by a borehole, comprising:

deriving measurements of a plurality of characteristics of an earth formation;

computing with a machine the portions of said earth formation made up of a first set of formation parameters in response to said plurality of measurements and generating computed output signals representative of the formation bulk volume percentage of each parameter of said first set;

testing said computed output signals to determine the feasibility of said formation parameter portion computations and generating at least one feasibility test signal representative of the feasibility of said computations;

computing with a machine the portions of said formations made up of a second set of predetermined formation parameters if said at least one feasibility test signal indicates that the computations using said first set are not feasible and generating computed output signals representative of the formation bulk volume percentage of each parameter of said second set;

testing the feasibility of said computed output signals for said second set of formation parameter portion computations; and recording the computed output signals from whichever set, if any, produced feasible computations.

4. The method of claim 3 wherein the step of deriving measurements includes the steps of measuring the acoustic travel time of a formation at a selected depth level in a borehole, measuring the hydrogen content of said formation at said depth level, and measuring the bulk density of said formation at said depth level.

5. The method of claim 4 wherein the step of computing the bulk volume percentages of the formation parameters of said first and second sets includes computing said percentages $P_1$, $P_2$, $P_3$ and $P_4$ of selected formation parameters in accordance with the expressions $$k_1 \Delta t = P_1 \Delta t_1 + P_2 \Delta t_2 + P_3 \Delta t_3 + P_4 \Delta t_4$$
$$k_2 H = P_1 H_1 + P_2 H_2 + P_3 H_3 + P_4 H_4$$
$$k_3 \rho_\beta = P_1 \rho_1 + P_2 \rho_2 + P_3 \rho_3 + P_4 \rho_4$$
$$1 = P_1 + P_2 + P_3 + P_4$$

where $\Delta t$, $H$ and $\rho_\beta$ are the measured values of acoustic travel time, hydrogen index and bulk density of said formation, $k_1$, $k_2$, and $k_3$ are calibration constants of the exploring devices which measure $\Delta t$, $H$ and $\rho_\beta$ respectively, and $\Delta t_1$, $H_1$, $\rho_1$, etc. are constants representative of the responses of the particular exploring devices to each parameter.

6. The method of claim 3 and further including the steps of generating a set indicator signal indicative of which set of formation parameters is recorded, and recording said set indicator signal along with said computed output signal to thereby indicate which set of formation parameters is recorded.

7. The method of claim 3 and further including the step of recording the computed output signals derived from a previous depth level if feasible computations are not obtained at said depth level under consideration.

8. The method of claim 3 wherein the step of testing said computed output signals for feasibility includes generating a feasibility test signal indicative of the non-feasibility of said computed signals upon at least one selected computed signal exceeding a predetermined limit.

9. A machine operated method of evaluating earth formations traversed by a borehole, comprising:

deriving measurements of a plurality of characteristics of an earth formation;

using at least one of said measurements to determine which set or group of sets of formation parameters are most probable in said earth formation;

supplying at least some of said measurements to a machine to compute the portions of said earth formation made up of a first one of said most probable sets of formation parameters;

testing the feasibility of said formation parameter portion computations;

using at least some of said measurements to compute the portions of said earth formation made up of a second one of said most probable sets of formation parameters if the computations using said first set are not feasible;

testing the feasibility of said second set formation parameter computations; and recording the formation parameter portion computations from whichever set, if any, produced feasible computations.

10. A machine operated method of evaluating earth formations traversed by a borehole, comprising:

deriving measurements of a plurality of characteristics of an earth formation;

supplying at least some of said measurements to a machine to compute the portions of said earth formation made up of a first set of formation parameters;

testing the feasibility of said formation parameter portion computations;

using at least one of said measurements to determine which one or group of sets of formation parameters are most probable in said earth formation if said computations using said first set of formation parameters are not feasible;

using at least some of said measurements to compute the portions of said formations made up of at least one of said most probable sets of formation parameters if said computations using said first set of parameters are not feasible; and testing the feasibility of said second set formation parameter computations, whereby the true formation parameters will be considered to be said first set of formation parameters if said first set computations are feasible and said at least one most probable set of formation parameters if said first set parameter computations are not feasible and said at least one most probable set computations are feasible.

11. The method of claim 9 wherein the step of deriving measureemnts includes the steps of measuring the acoustic travel time of a formation at a selected depth level in a borehole, measuring the hydrogen content of said formation at said depth level, and measuring the bulk density of said formation at said depth level.

12. The method of claim 11 wherein the step of computing the portions of said formation made up of the formation parameters of said sets of formation parameters includes computing percentages $P_1$, $P_2$, $P_3$ and $P_4$ of selected formation parameters in accordance with the expressions $$k_1 \Delta t = P_1 \Delta t + P_2 \Delta t_2 + P_3 \Delta t_3 + P_4 \Delta t_4$$

$$k_2 H = P_1 H_1 + P_2 H_2 + P_3 H_3 + P_4 H_4$$

$$k_3 \rho_B = P_1 \rho_1 + P_2 \rho_2 + P_3 \rho_3 + P_4 \rho_4$$

$$1 = P_1 + P_2 + P_3 + P_4$$

where $\Delta t$, H and $\rho_B$ are the measured values of acoustic travel time, hydrogen index and bulk density of said formation, $k_1$, $k_2$, and $k_3$ are calibration constants of the exploring devices which measure $\Delta t$, H and $\rho_B$ respectively, and $\Delta t$, $H_1$, $\rho_1$, etc. are constants representative of the responses of the particular exploring devices to each parameter.

13. The method of claim 9 wherein one of said derived measurements is representative of the spontaneous potential or natural radioactivity of said formation and the step of using at least one measurement to determine the most probable set or group of sets of formation parameters includes the steps of selecting one set or group of sets if said spontaneous potential or natural radioactivity measurement value is greater than a selected reference value, and selecting another set or group of sets of formation parameters if said spontaneous potential or natural radioactivity measurement is less than said selected reference value.

14. The method of claim 10 wherein the step of deriving measurements includes the steps of measuring the acoustic travel time of a formation at a selected depth level in a borehole, measuring the hydrogen content of said formation at said depth level, and measuring the bulk density of said formation at said depth level.

15. The method of claim 10 wherein two of said derived measurements are of the hydrogen index and bulk density $\rho_b$ of the formation and the step of using at least one measurement to determine which set or group of sets is most probable includes the steps of using the measured hydrogen content of said formation to compute the porosity $\phi_N$ at said depth level; computing the lithology indicator N in accordance with the expression $$N = \frac{H_F - \phi_N}{\rho_B - \rho_F}$$

where $H_F$ is the hydrogen index of the formation interstitial fluid, and $\rho_F$ is the bulk density of the interstitial fluid; selecting one set or group of sets of formation parameters if N is greater than a selected reference value; and selecting another set or group of sets of formation parameters if N is less than a selected value.

16. The method of claim 3 and further including the step of using selected ones of said computed output signals to compute the effective porosity and amount of clay in said formation.

17. The method of claim 16 wherein the step of deriving measurements further includes the step of deriving a measurement of the resisitivity of said formation and further including the step of combining said effective porosity and clay computations with said resistivity measurement to compute the water saturation of said formation.

18. Apparatus for processing data representative of earth formations traversed by a borehole, comprising:

means for deriving measurements of a plurality of characteristics of an earth formation;

means responsive to said measurements for computing the portions of said earth formation made up of a first set of formation parameters and generating output signals representative thereof;

means responsive to said output signals for testing the feasibility of said formation parameter portion computations and generating a feasibility test signal representative thereof; and means responsive to said measurements and said feasibility test signal for computing the portions of said formations made up of a second predetermined set of formation parameters if the computations using said first set of formation parameters are not feasible.

19. The apparatus of claim 18 wherein the means for deriving measurements includes means for measuring the acoustic travel time of a formation at a selected depth level in a borehole, means for measuring the hydrogen content of said formation at said depth level, and means for measuring the bulk density of said formation at said depth level.

20. The apparatus of claim 19 wherein the means for computing the portions of the formation parameters of said first and second sets includes means for computing percentages $P_1$, $P_2$, $P_3$ and $P_4$ of selected formation parameters in accordance with the expressions $$k_1 \Delta t = P_1 \Delta t_1 + P_2 \Delta t_2 + P_3 \Delta t_3 + P_4 \Delta t_4$$
$$k_2 H = P_1 H_1 + P_2 H_2 + P_3 H_3 + P_4 H_4$$
$$k_3 \rho_B = P_1 \rho_1 + P_2 \rho_2 + P_3 \rho_3 + P_4 \rho_4$$
$$1 = P_1 + P_2 + P_3 + P_4$$

where $\Delta t$, $H$ and $\rho_B$ are the measured values of acoustic travel time, hydrogen index and bulk density of said formation, $k_1$, $k_2$, and $k_3$ are calibration constants of the exploring devices which measure $\Delta t$, $H$ and $\rho_B$ respectively, and $\Delta t_1$, $H_1$, $\rho_1$, etc. are constants representative of the responses of the particular exploring devices to each parameter.

21. Apparatus for processing data representative of earth formations traversed by a borehole, comprising:
means deriving measurements of a plurality of characteristics of an earth formation;
means responsive to at least one of said measurements for determining which one or group of sets of formation parameters are most probable in said earth formation; and
means responsive to at least some of said measurements for computing the portions of said earth formation made up of at least one of said most probable sets of formation parameters.

22. Apparatus for processing data representative of earth formations traversed by a borehole, comprising:
means for deriving measurements of a plurality of characteristics of an earth formation;
computing means responsive to said measurements and adapted for computing the portions of said earth formation made up of a selected set of formation parameters; and
means for selecting the set of formation parameters used by said computing means including means for causing said computing means to compute said formation parameter portions using ordered sets of predetermined formation parameters, said sets being ordered in accordance with the probability of occurrence in said formation of the formation parameters which make up each set.

23. Apparatus for processing data representative of earth formations traversed by a borehole, comprising:
means for deriving measurements of a plurality of characteristics of an earth formation;
computing means responsive to said measurements for computing the portions of said earth formation made up of a selected set of formation parameters;
means for selecting the set of formation parameters used by said computing means including means for causing said computing means to compute said formation parameter portions using ordered sets of predetermined formation parameters, said sets being ordered in accordance with the probability of occurrence in said formation of the formation parameters which make up each set; and
means for testing the feasibility of said formation parameter portion computations for each set in sequence and outputting the formation parameter portion computations for the first set which produces feasible computations.

24. Apparatus for processing data representative of earth formations traversed by a borehole, comprising:
means for deriving measurements of a plurality of characteristics of an earth formation;
means responsive to at least some of said measurements for computing the portions of said earth formation made up of a selected set of formation parameters; and
means for selecting the set of formation parameters used by said computing means including means responsive to at least one of said derived measurements for determining which set or group of sets of formation parameters are most probable in said formation and generating an output signal representative thereof, means responsive to said output signal for causing said computing means to compute said formation parameter portions using a selected group of ordered sets of formation parameters, said sets being ordered in accordance with the probability of occurrence in said formation of the formation parameters which make up each set.

25. The method of claim 1 and further including repeating the steps of testing the feasibility of said computations and using said derived measurements to compute formation portions with other predetermined sets of formation parameters if the last tested computations are not feasible.

References Cited

UNITED STATES PATENTS 3,508,439   4/1970   Alger _____ 73—152

R. D. BENNETT, JR., Primary Examiner

H. A. BIRMIEL, Assistant Examiner

U.S. Cl. X.R.

324—1; 340—15.5 BH, 18 R

UNITED STATES PATENT OFFICE
CERTIFICATE OF CORRECTION

Patent No. 3,721,960  Dated March 20, 1973

Inventor(s) David H. Tinch et al

It is certified that error appears in the above-identified patent and that said Letters Patent are hereby corrected as shown below:

IN THE ABSTRACT OF THE DISCLOSURE

Column 1, line 19, after "bulk" --density-- should be inserted;

IN THE SPECIFICATION

Column 5, line 22, in equation (6) "(LSM)" should read --(LMS)--;

Column 5, line 47, "one" should read --on--;

Column 5, line 54, after "third" --most-- should be inserted;

Column 7, line 38, ":" should be deleted;

after line 38, --which make up each of the matrix sets 1-n.-- should be inserted;

line 63, after "counter" --27.-- should be inserted;

line 63, from "to its 1 state thus energizing the gates 19 reset to its zero state" should be deleted; and --Since the counter 27 had been previously reset to its zero state-- should be inserted;

Column 9, line 9, "65" should read --56--;

Column 11, line 44, after "gate" --35-- should be inserted;

IN THE CLAIMS

Column 14, Claim 3, line 9, "formation" should read --formations--;

Column 15, Claim 12, line 61, "$P_1 \Delta t$" should read --$P_1 \Delta t_1$--.

Signed and sealed this 11th day of December 1973.

(SEAL)
Attest:

EDWARD M. FLETCHER, JR.
Attesting Officer

RENE D. TEGTMEYER
Acting Commissioner of Patents